(12) United States Patent
Baldwin et al.

(10) Patent No.: US 9,405,892 B2
(45) Date of Patent: *Aug. 2, 2016

(54) PREVENTING SPOOFING ATTACKS FOR BONE CONDUCTION APPLICATIONS

(71) Applicant: AT&T Intellectual Property I, L.P., Atlanta, GA (US)

(72) Inventors: Christopher Baldwin, Algonquin, IL (US); Brian S. Amento, Morris Plains, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 125 days.

This patent is subject to a terminal disclaimer.

(21) Appl. No.: 14/090,668

(22) Filed: Nov. 26, 2013

(65) Prior Publication Data

US 2015/0150116 A1    May 28, 2015

(51) Int. Cl.
*G06F 21/32* (2013.01)
*H04W 12/10* (2009.01)

(52) U.S. Cl.
CPC .............. *G06F 21/32* (2013.01); *H04W 12/10* (2013.01)

(58) Field of Classification Search
CPC ..... G06F 21/32; G07C 9/00071; H04L 63/08; H04L 9/3231; H04B 13/005
USPC ........ 726/16, 23, 30; 713/168–170, 182, 186; 340/5.6, 5.65, 5.81, 5.82, 10.42
See application file for complete search history.

(56) References Cited

U.S. PATENT DOCUMENTS

| | | | |
|---|---|---|---|
| 3,629,521 | A | 12/1971 | Puharich et al. |
| 4,340,778 | A | 7/1982 | Cowans et al. |
| 4,421,119 | A | 12/1983 | Pratt, Jr. |
| 4,720,607 | A | 1/1988 | de Moncuit |
| 4,799,498 | A | 1/1989 | Collier |
| 5,073,950 | A | 12/1991 | Colbert et al. |
| 5,319,747 | A | 6/1994 | Gerrissen et al. |
| 5,327,506 | A | 7/1994 | Stites, III |
| 5,368,044 | A | 11/1994 | Cain et al. |
| 5,495,241 | A | 2/1996 | Doing et al. |
| 5,615,681 | A | 4/1997 | Ohtomo |
| 5,664,227 | A | 9/1997 | Mauldin et al. |
| 5,766,208 | A | 6/1998 | Mcewan |
| 5,810,731 | A | 9/1998 | Sarvazyan et al. |
| 5,836,876 | A | 11/1998 | Dimarogonas |

(Continued)

FOREIGN PATENT DOCUMENTS

| | | |
|---|---|---|
| AU | 2003257031 | 2/2004 |
| AU | 2007200415 | 8/2007 |

(Continued)

OTHER PUBLICATIONS

U.S. Office Action dated Mar. 8, 2010 in U.S. Appl. No. 11/586,142.

(Continued)

*Primary Examiner* — Shanto M Abedin
(74) *Attorney, Agent, or Firm* — Hartman & Citrin LLC

(57) ABSTRACT

Concepts and technologies are disclosed herein for preventing spoofing attacks for bone conduction applications. According to one aspect, a device can receive an authentication signal that has propagated through a body. The device can prevent an adversary from using the authentication signal to spoof a user to be authenticated by the device. The device can also authenticate the user.

15 Claims, 11 Drawing Sheets

(56) References Cited

U.S. PATENT DOCUMENTS

| | | |
|---|---|---|
| 6,115,482 A | 9/2000 | Sears et al. |
| 6,135,951 A | 10/2000 | Richardson et al. |
| 6,151,208 A | 11/2000 | Bartlett |
| 6,234,975 B1 | 5/2001 | Mcleod et al. |
| 6,380,923 B1 | 4/2002 | Fukumoto et al. |
| 6,396,930 B1 | 5/2002 | Vaudrey et al. |
| 6,409,684 B1 | 6/2002 | Wilk |
| 6,507,662 B1 | 1/2003 | Brooks |
| 6,580,356 B1 | 6/2003 | Alt et al. |
| 6,589,287 B2 | 7/2003 | Lundborg |
| 6,631,197 B1 | 10/2003 | Taenzer |
| 6,754,472 B1* | 6/2004 | Williams ............ H04Q 9/04 455/100 |
| 6,783,501 B2 | 8/2004 | Takahashi et al. |
| 6,844,660 B2 | 1/2005 | Scott |
| 6,898,299 B1 | 5/2005 | Brooks |
| 7,010,139 B1 | 3/2006 | Smeehuyzen |
| 7,123,752 B2 | 10/2006 | Kato et al. |
| 7,148,879 B2 | 12/2006 | Amento et al. |
| 7,198,607 B2 | 4/2007 | Jamsen |
| 7,206,423 B1 | 4/2007 | Feng et al. |
| 7,370,208 B2 | 5/2008 | Levin et al. |
| 7,405,725 B2 | 7/2008 | Mohri et al. |
| 7,536,557 B2 | 5/2009 | Murakami et al. |
| 7,539,533 B2 | 5/2009 | Tran |
| 7,615,018 B2 | 11/2009 | Nelson et al. |
| 7,625,315 B2 | 12/2009 | Hickman |
| 7,648,471 B2 | 1/2010 | Hobson |
| 7,671,351 B2 | 3/2010 | Setlak et al. |
| 7,708,697 B2 | 5/2010 | Wilkinson et al. |
| 7,760,918 B2 | 7/2010 | Bezvershenko et al. |
| 7,778,848 B1 | 8/2010 | Reeves |
| 7,796,771 B2 | 9/2010 | Calhoun et al. |
| 7,878,075 B2 | 2/2011 | Johansson et al. |
| 7,914,468 B2 | 3/2011 | Shalon et al. |
| 8,023,669 B2 | 9/2011 | Segev et al. |
| 8,023,676 B2 | 9/2011 | Abolfathi et al. |
| 8,031,046 B2 | 10/2011 | Franza et al. |
| 8,098,129 B2 | 1/2012 | Falck et al. |
| 8,196,470 B2 | 6/2012 | Gross et al. |
| 8,200,289 B2 | 6/2012 | Joo et al. |
| 8,253,693 B2 | 8/2012 | Buil et al. |
| 8,270,637 B2 | 9/2012 | Abolfathi |
| 8,270,638 B2 | 9/2012 | Abolfathi et al. |
| 8,312,660 B1 | 11/2012 | Fujisaki |
| 8,348,936 B2 | 1/2013 | Trembly et al. |
| 8,421,634 B2 | 4/2013 | Tan et al. |
| 8,467,742 B2 | 6/2013 | Hachisuka et al. |
| 8,482,488 B2 | 7/2013 | Jannard |
| 8,491,446 B2 | 7/2013 | Hinds et al. |
| 8,500,271 B2 | 8/2013 | Howell et al. |
| 8,521,239 B2 | 8/2013 | Hosoi et al. |
| 8,540,631 B2 | 9/2013 | Penner et al. |
| 8,542,095 B2 | 9/2013 | Kamei |
| 8,560,034 B1 | 10/2013 | Diab et al. |
| 8,594,568 B2 | 11/2013 | Falck |
| 8,750,852 B2 | 6/2014 | Forutanpour et al. |
| 8,922,427 B2* | 12/2014 | Dehnie ............ G01S 19/215 342/357.3 |
| 2001/0013546 A1 | 8/2001 | Ross |
| 2001/0051776 A1 | 12/2001 | Lenhardt |
| 2003/0048915 A1 | 3/2003 | Bank |
| 2003/0066882 A1 | 4/2003 | Ross |
| 2003/0125017 A1 | 7/2003 | Greene et al. |
| 2003/0133008 A1 | 7/2003 | Stephenson |
| 2004/0152440 A1 | 8/2004 | Yoda et al. |
| 2006/0018488 A1 | 1/2006 | Viala et al. |
| 2006/0132455 A1 | 6/2006 | Rimas-Ribikauskas |
| 2006/0149337 A1 | 7/2006 | John |
| 2007/0012507 A1 | 1/2007 | Lyon |
| 2007/0142874 A1 | 6/2007 | John |
| 2008/0064955 A1 | 3/2008 | Miyajima |
| 2008/0223925 A1* | 9/2008 | Saito ............ G06Q 20/341 235/380 |
| 2008/0260211 A1* | 10/2008 | Bennett ............ G06K 9/00 382/115 |
| 2009/0149722 A1 | 6/2009 | Abolfathi et al. |
| 2009/0228791 A1 | 9/2009 | Kim |
| 2009/0234262 A1 | 9/2009 | Reid, Jr. et al. |
| 2009/0287485 A1* | 11/2009 | Glebe ............ G10L 21/0208 704/233 |
| 2009/0289958 A1 | 11/2009 | Kim et al. |
| 2009/0309751 A1 | 12/2009 | Kano et al. |
| 2010/0016741 A1 | 1/2010 | Mix et al. |
| 2010/0066664 A1 | 3/2010 | Son et al. |
| 2010/0137107 A1 | 6/2010 | Jamsa et al. |
| 2010/0162177 A1 | 6/2010 | Eves et al. |
| 2010/0168572 A1 | 7/2010 | Sliwa et al. |
| 2010/0286571 A1 | 11/2010 | Allum et al. |
| 2010/0297944 A1 | 11/2010 | Lee |
| 2010/0315206 A1 | 12/2010 | Schenk et al. |
| 2010/0316235 A1 | 12/2010 | Park et al. |
| 2011/0022025 A1 | 1/2011 | Savoie et al. |
| 2011/0125063 A1 | 5/2011 | Shalon et al. |
| 2011/0134030 A1 | 6/2011 | Cho |
| 2011/0135106 A1 | 6/2011 | Yehuday et al. |
| 2011/0137649 A1 | 6/2011 | Rasmussen et al. |
| 2011/0152637 A1 | 6/2011 | Kateraas et al. |
| 2011/0155479 A1 | 6/2011 | Oda |
| 2011/0227856 A1 | 9/2011 | Corroy et al. |
| 2011/0245669 A1 | 10/2011 | Zhang |
| 2011/0255702 A1 | 10/2011 | Jensen |
| 2011/0260830 A1 | 10/2011 | Weising |
| 2011/0269601 A1 | 11/2011 | Nelson et al. |
| 2011/0282662 A1 | 11/2011 | Aonuma et al. |
| 2012/0010478 A1 | 1/2012 | Kinnunen et al. |
| 2012/0011990 A1 | 1/2012 | Mann |
| 2012/0058859 A1 | 3/2012 | Elsom-Cook et al. |
| 2012/0065477 A1 | 3/2012 | Enomoto |
| 2012/0065506 A1 | 3/2012 | Smith |
| 2012/0202479 A1 | 8/2012 | Sugitani et al. |
| 2012/0212441 A1 | 8/2012 | Christiansson et al. |
| 2012/0290832 A1* | 11/2012 | Antequera Rodriguez ....... G06Q 20/40145 713/155 |
| 2013/0034238 A1 | 2/2013 | Abolfathi |
| 2013/0041235 A1 | 2/2013 | Rogers et al. |
| 2013/0119133 A1 | 5/2013 | Michael et al. |
| 2013/0120458 A1 | 5/2013 | Celebisoy et al. |
| 2013/0135223 A1 | 5/2013 | Shai |
| 2013/0142363 A1* | 6/2013 | Amento ............ H04K 1/00 381/151 |
| 2013/0171599 A1 | 7/2013 | Bleich et al. |
| 2013/0173926 A1* | 7/2013 | Morese ............ G06F 21/32 713/186 |
| 2013/0212648 A1 | 8/2013 | Tietjen et al. |
| 2013/0215060 A1 | 8/2013 | Nakamura |
| 2013/0225915 A1 | 8/2013 | Redfield et al. |
| 2013/0278396 A1 | 10/2013 | Kimmel |
| 2013/0288655 A1 | 10/2013 | Foruntanpour et al. |
| 2013/0346620 A1 | 12/2013 | Gizis et al. |
| 2014/0009262 A1* | 1/2014 | Robertson ............ A61B 5/0006 340/5.52 |
| 2014/0028604 A1 | 1/2014 | Morinaga et al. |
| 2014/0035884 A1 | 2/2014 | Oh et al. |
| 2014/0097608 A1 | 4/2014 | Buzhardt et al. |
| 2014/0099991 A1 | 4/2014 | Cheng et al. |
| 2014/0107531 A1 | 4/2014 | Baldwin |
| 2014/0168093 A1 | 6/2014 | Lawrence |
| 2014/0168135 A1 | 6/2014 | Saukko et al. |
| 2014/0174174 A1 | 6/2014 | Uehara et al. |
| 2014/0188561 A1 | 7/2014 | Tenbrock et al. |
| 2014/0210791 A1 | 7/2014 | Hanauer et al. |
| 2014/0240124 A1 | 8/2014 | Bychkov |
| 2015/0084011 A1 | 3/2015 | Park et al. |
| 2015/0092962 A1 | 4/2015 | Amento et al. |
| 2015/0120465 A1 | 4/2015 | Baldwin et al. |
| 2015/0128094 A1 | 5/2015 | Baldwin et al. |
| 2015/0137936 A1 | 5/2015 | Baldwin et al. |
| 2015/0137960 A1 | 5/2015 | Baldwin et al. |

(56) References Cited

U.S. PATENT DOCUMENTS

2015/0138062 A1 5/2015 Baldwin et al.
2015/0199950 A1 7/2015 Heiman

FOREIGN PATENT DOCUMENTS

| CA | 1207883 | 7/1986 |
|---|---|---|
| EP | 0712114 | 5/1996 |
| EP | 0921753 | 6/1999 |
| EP | 1436804 | 2/2004 |
| EP | 2312997 | 4/2011 |
| EP | 2643981 | 5/2012 |
| EP | 2483677 | 8/2012 |
| GB | 2226931 | 7/1990 |
| GB | 2348086 | 9/2000 |
| JP | 02249017 | 10/1990 |
| JP | 04-317638 A | 11/1992 |
| JP | 2003058190 | 2/2003 |
| JP | 2005142729 | 6/2005 |
| JP | 2010210730 | 9/2010 |
| KR | 20100056688 | 5/2010 |
| TW | 200946887 | 8/1997 |
| WO | WO 8201329 | 4/1982 |
| WO | WO 9601585 | 1/1996 |
| WO | WO 03033882 | 4/2003 |
| WO | WO 2006094372 | 9/2006 |
| WO | WO 2009001881 | 12/2008 |
| WO | WO 2010045158 | 4/2010 |
| WO | WO 2012168534 | 12/2012 |

OTHER PUBLICATIONS

U.S. Office Action dated Aug. 12, 2010 in U.S. Appl. No. 11/586,142.
Examiner's Answer to Appeal Brief dated Apr. 22, 2011 in U.S. Appl. No. 11/586,142.
Patent Board Decision on Appeal dated Sep. 25, 2014 in U.S. Appl. No. 11/586,142.
Notice of Allowance dated Dec. 18, 2014 in U.S. Appl. No. 11/586,142.
Zhong et al., "OsteoConduct: Wireless Body-Area Communication based on Bone Conduction," Proceeding of the ICST 2nd International Conference on Body Area Networks, BodyNets 2007.
Travis Deyle et al., "Hambone: A bio-acoustic gesture interface," 2007 11th IEEE International Symposium on Wearable Computers, 2007.
Scanlon, Michael V. Acoustic sensor for health status monitoring. Army Research Lab Aberdeen Proving Ground MD, 1998.
Lopez, et al., "New healthcare society supported by wearable sensors and information mapping-based services." International Journal of Networking and Virtual Organisations 9.3 (2011): 233-247.
Scanlon, Michael V. "Acoustic sensors in the helmet detect voice and physiology." AeroSense 2003. International Society for Optics and Photonics, 2003.
Kompis, Martin, and Rudolf Haeusler, "Electromagnetic interference of bone-anchored hearing aids by cellular phones revisited," Acta oto-laryngologica 122.5, 2002, 510-512.
Amento et al., "The Sound of One Hand: A Wrist-Mounted Bio-Acoustic Fingertip Gesture Interface," Short Talk: It's All About Sound, Apr. 20, 2002, 724-725, ACM, Minneapolis, Minnesota, USA.
"Kinect Gestures," retrieved from http://support.xbox.com/en-US/xbox-360/kinect/body-controller on Oct. 24, 2013.
Mark Billinghurst, "Chapter 14: Gesture Based Interaction," Haptic Input, Aug. 24, 2011.
Chris Harrison, Desney Tan, Dan Morris, "Skinput: Appropriating the Skin as an Interactive Canvas," CommuniCations of the ACM 54.8, 2011, 111-118.
T. Scott Saponas, et al., "Enabling always-available input with muscle-computer interfaces," Proceedings of the 22nd Annual ACM Symposium on User Interface Software and Technology, ACM, 2009.
Jao Henrique Donker, "The Body as a communication medium," 2009.
Sang-Yoon Chang, et al., "Body Area Network Security: Robust Key Establishment Using Human Body Channel."
Vidya Bharrgavi, et al., "Security Solution for Data Integrity in Wireless BioSensor Networks," Distributed Computing Systems Workshops, 2007, ICDCSW'07, 27th International Conference, IEEE, 2007.
Daniel Halperin, et al., "Pacemakers and Implantable Cardiac Defibrillators: Software Radio Attacks and Zero-Power Defenses," Security and Privacy, SP 2008, IEEE Symposium, IEEE, 2008.
Carmen C. Y. Poon, et al., "A Novel Biometrics Method to Secure Wireless Body Area Sensor Networks for Telemedicine and M-Health," Communications Magazine, IEEE 44.4, 2006, 73-81.
Zicheng Liu, et al., "Direct Filtering for Air-and Bone-Conductive Microphones," Multimedia Signal Processing, 2004 IEEE 6th Workshop, IEEE, 2004.
U.S. Office Action dated Feb. 13, 2013 in U.S. Appl. No. 13/309,124.
U.S. Office Action dated Sep. 24, 2013 in U.S. Appl. No. 13/309,124.
U.S. Office Action dated Aug. 25, 2015 in U.S. Appl. No. 11/586,142.
U.S. Office Action dated Aug. 25, 2015 in U.S. Appl. No. 14/083,094.
U.S. Office Action dated Jun. 25, 2015 in U.S. Appl. No. 14/083,110.
U.S. Appl. No. 14/482,087, filed Sep. 10, 2014.
U.S. Appl. No. 14/482,091, filed Sep. 10, 2014.
U.S. Appl. No. 14/482,101, filed Sep. 10, 2014.
U.S. Appl. No. 14/482,078, filed Sep. 10, 2014.
U.S. Appl. No. 14/482,658, filed Oct. 15, 2014.
Non-final Office Action mailed on Jan. 29, 2014 in U.S. Appl. No. 13/309,124.
Mujibiya, Adiyan, et al. "The sound of touch: on-body touch and gesture sensing based on transdermal ultrasound propagation." Proceedings of the 2013 ACM international conference on Interactive tabletops and surfaces. ACM, 2013.
Harrison, Chris, Robert Xiao, and Scott Hudson. "Acoustic barcodes: passive, durable and inexpensive notched identification tags." Proceedings of the 25th annual ACM symposium on User interface software and technology. ACM, 2012.
Yoo, Jerald, Namjun Cho, and Hoi-Jun Yoo. "Analysis of body sensor network using human body as the channel." Proceedings of the ICST 3rd international conference on Body area networks. ICST (Institute for Computer Sciences, Social-Informatics and Telecommunications Engineering), 2008.
Ni, Tao, and Patrick Baudisch. "Disappearing mobile devices." Proceedings of the 22nd annual ACM symposium on User interface software and technology. ACM, 2009.
Hinckley, Ken, and Hyunyoung Song, "Sensor synaesthesia: touch in motion, and motion in touch." Proceedings of the SIGCHI Conference on Human Factors in Computing Systems. ACM, 2011.
Hinge, Dhanashree, and S. D. Sawarkar. "Mobile to Mobile data transfer through Human Area Network." IJRCCT 2.11 (2013): 1181-1184.
Park, Duck Gun, et al. "TAP: touch-and-play." Proceedings of the SIGCHI conference on Human Factors in computing systems. ACM, 2006.
Ruiz, J. Agud, and Shigeru Shimamoto. "A study on the transmission characteristics of the human body towards broadband intra-body communications." Consumer Electronics, 2005.(ISCE 2005). Proceedings of the Ninth International Symposium on. IEEE, 2005.
Nagai, Ryoji, et al. "Near-Field Coupling Communication Technology for Human-Area Networking." Proc. Conf. on Information and Communication Technologies and Applications (ICTA2011), International Institute of Informatics and Systems (IIIS). 2012.
Lipkova, Jolana, and Jaroslav Cechak. "Transmission of Information Using the Human Body." IMCIC 2010.
Maruf, Md Hasan. "An Input Amplifier for Body-Channel Communication." (2013).
Rekimoto, Jun. "Gesturewrist and gesturepad: Unobtrusive wearable interaction devices." Wearable Computers, 2001. Proceedings. Fifth International Symposium on. IEEE, 2001.
Sang-Yoon Chang, et al., "Body Area Network Security: Robust Key Establishment Using Human Body Channel," retrieved from https://www.usenix.org/system/files/conference/healthsec12/healthsec12-final15.pdf on Oct. 16, 2013.

(56) References Cited

OTHER PUBLICATIONS

U.S. Office Action dated Dec. 17, 2015 in U.S. Appl. No. 14/065,663.
U.S. Office Action dated Nov. 19, 2015 in U.S. Appl. No. 14/083,499.
U.S. Office Action dated Jan. 11, 2016 in U.S. Appl. No. 14/514,658.
U.S. Office Action dated Feb. 25, 2016 in U.S. Appl. No. 14/072,126.
U.S. Notice of Allowance dated Apr. 4, 2016 in U.S. Appl. No. 14/083,499.
U.S. Office Action dated Mar. 16, 2016 in U.S. Appl. No. 14/482,087.
U.S. Office Action dated Mar. 10, 2016 in U.S. Appl. No. 14/482,091.

* cited by examiner

PREVENTING SPOOFING ATTACKS FOR BONE CONDUCTION APPLICATIONS

BACKGROUND

Bone conduction is a developing communication technology. One application of bone conduction technologies is authentication. The unique composition of an individual results in unique changes to a signal as the signal passes through the individual. As with any authentication technology, there are ways of defeating bone conduction-based authentication.

SUMMARY

Concepts and technologies are disclosed herein for preventing spoofing attacks for bone conduction applications. According to one aspect, a device can receive an authentication signal that has propagated through a body. The device can prevent an adversary from using the authentication signal to spoof a user to be authenticated by the device. The device can also authenticate the user.

In some embodiments, the device can receive a time stamp from a user device associated with the user. The time stamp can indicate a time at which the user device transmitted the authentication signal to the body. The device can determine a time delay using the time stamp and can compare the time delay to a time delay specification to determine whether the user device is to be authenticated. The time delay specification can be an expected time delay. Alternatively, the time delay specification can be a time delay threshold value.

In some embodiments, the device can generate a random noise. The random noise can convolve with the authentication signal to yield a convolved authentication signal. A backend authentication system can receive the convolved authentication signal from a surface of the device. The backend authentication system can also receive the random noise from the device. The backend authentication system can deconvolve the convolved authentication signal utilizing the random noise received from the device to isolate the authentication signal. The device can receive a notification from the backend authentication system. The notification can indicate that the user is authenticated to access the device.

In some embodiments, the authentication signal includes a convolved authentication signal that includes a first signal indicative of a unique body signature of the body of the user and a second signal sent by a vibrational filter system. The second signal can cause the first signal to be encrypted within the body to form the convolved authentication signal. The device can prevent the adversary from spoofing the user to be authenticated by the device at least in part by deconvolving the convolved authentication signal to isolate the unique body signature. The device can authenticate the user based upon the unique body signature. The device can receive the second signal separate from the convolved authentication signal. The device can deconvolve the convolved authentication signal to isolate the unique body signature using the second signal that is received separate from the convolved authentication signal.

It should be appreciated that the above-described subject matter may be implemented as a computer-controlled apparatus, a computer process/method, a computing system, a computing device, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
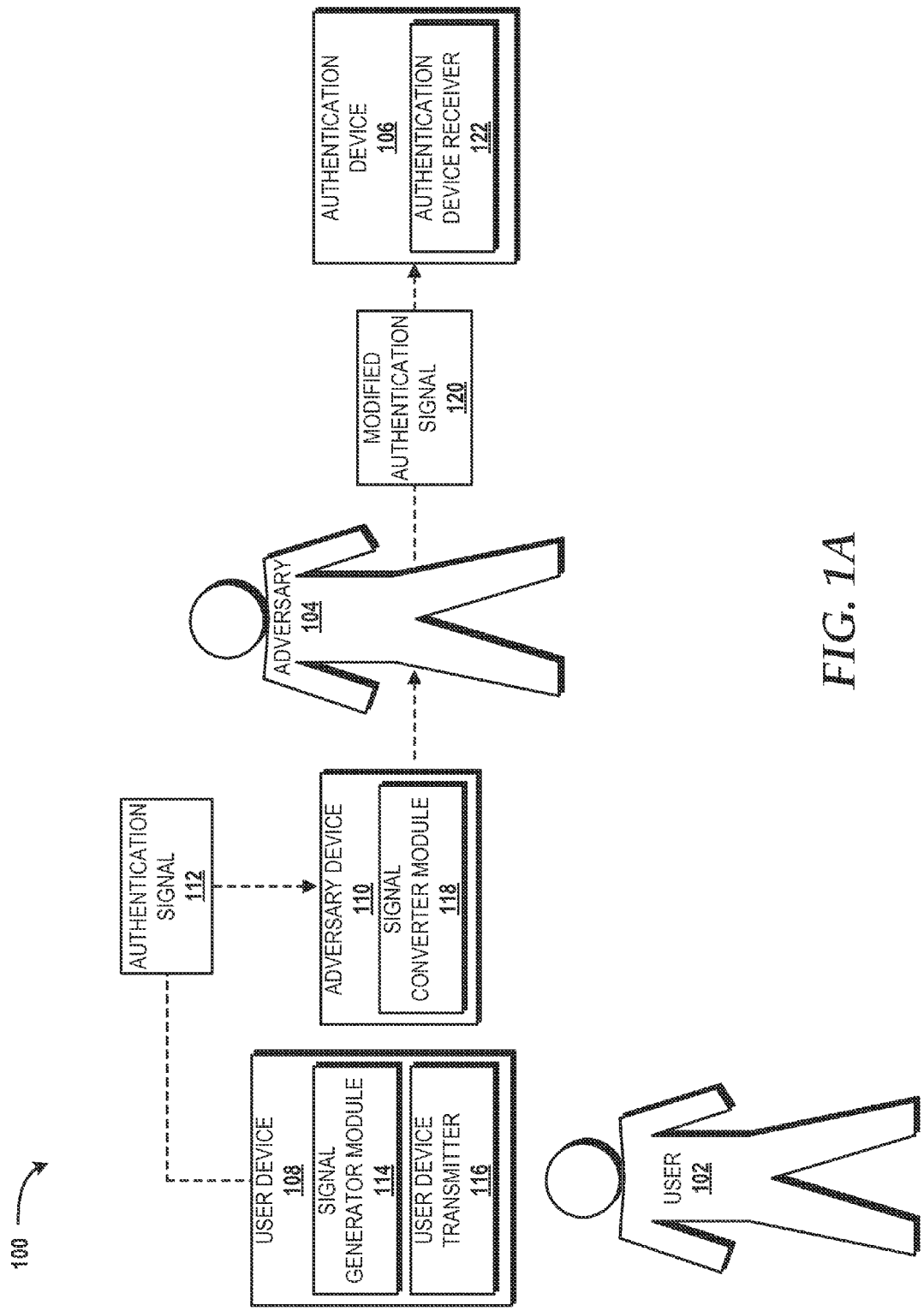
FIGS. 1A and 1B are block diagrams illustrating aspects of illustrative spoofing attacks that can be prevented using the concepts and technologies disclosed herein.

Concepts and technologies are disclosed herein for preventing spoofing attacks for bone conduction applications. According to one aspect, a device can receive an authentication signal that has propagated through a body. The device can prevent an adversary from using the authentication signal to spoof a user to be authenticated by the device. The device can also authenticate the user.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of disrupting bone conduction signals will be presented.

Figure 1B:
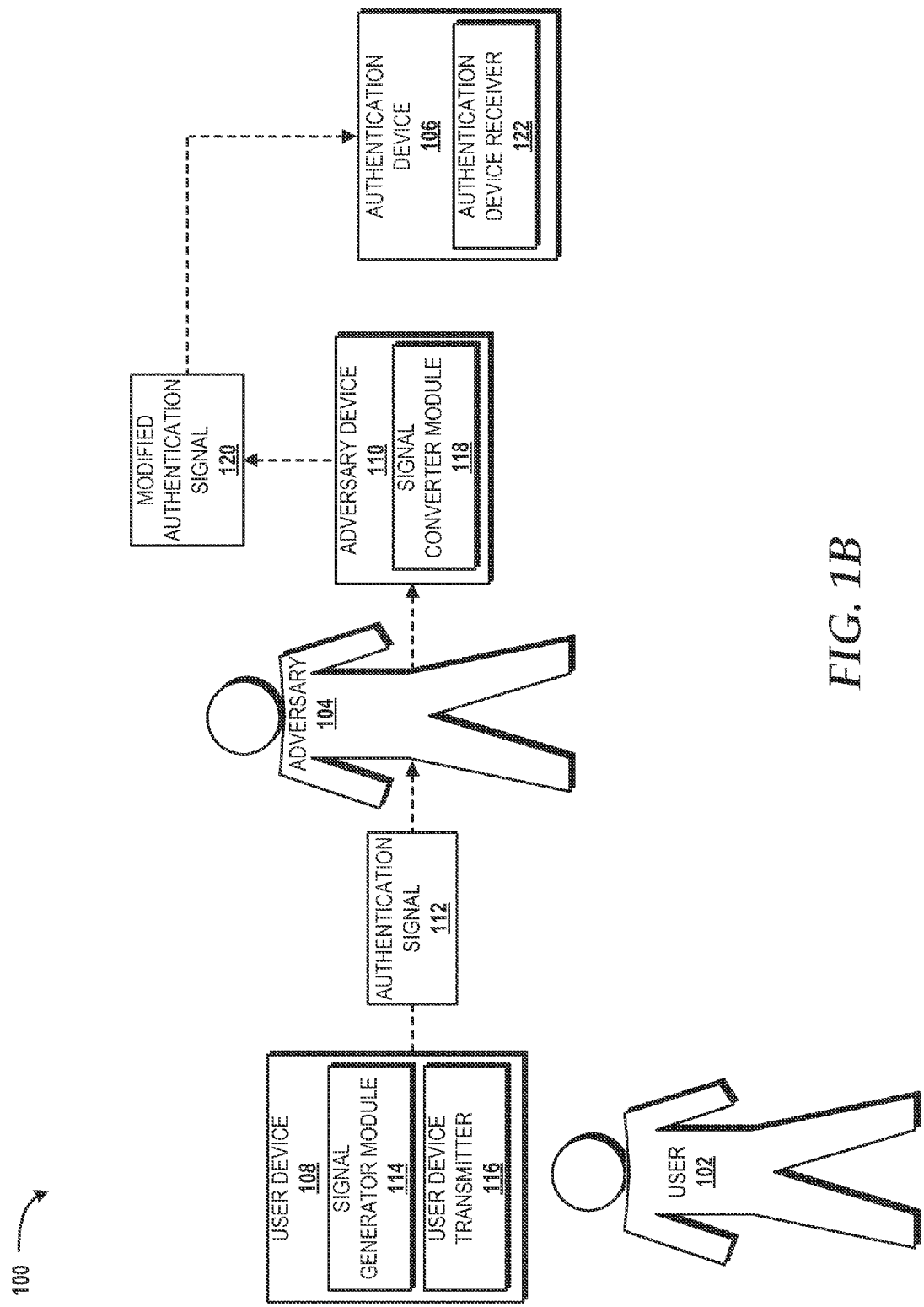

Referring now to FIGS. 1A and 1B, aspects of illustrative spoofing attacks that can be prevented using the concepts and technologies disclosed herein will be described. Although only two potential spoofing attacks are illustrated and described herein with reference to FIGS. 1A and 1B, those skilled in the art will appreciate the applicability of the concepts and technologies disclosed herein to other types of spoofing attacks. As such, the illustrative spoofing attacks now described should not be construed as limiting the potential applications of the concepts and technologies disclosed herein for preventing spoofing attacks.

The operating environment 100 shown in FIG. 1A includes a user 102, an adversary 104, an authentication device 106, a user device 108, and an adversary device 110. The user 102 can be authenticated by the authentication device 106 to access the authentication device 106, another device (not shown), or an area (also not shown) using a bone conduction-based authentication mechanism. The bone conduction-based authentication mechanism can utilize an authentication signal 112 generated by a signal generator module 114 of the user device 108. The signal generator module 114 can generate the authentication signal 112 so that the authentication signal 112 can be sent to the body of the user 102 via a user device transmitter 116 for propagation through the body, and more particularly, one or more bones of the user 102 to the authentication device 106. The authentication device 106, via an authentication device receiver 122, can receive the authentication signal 112 as modified by the body of the user 102 and can determine whether or not the user 102 is to be authenticated based upon the modified signal. In particular, the body composition of the user 102 can modify the signal such that the modified signal exhibits one or more unique effects, such as a change in the frequency, amplitude, and/or phase of the authentication signal 112, as a result of propagating through the body of the user 102. For example, the height, weight, body fat percentage, body muscle percentage, and/or bone characteristics, such as bone density and bone mass, of an individual can affect the frequency, amplitude, and/or phase of the authentication signal 112. These unique effects, which are collectively referred to herein as a unique body signature, can provide an authentication mechanism that is not easily replicated by other individuals, such as the adversary 104, due to the numerous potential differences among different individuals' body composition.

In the illustrated example, however, the adversary 104 is spoofing the user 102 via the adversary device 110 to authenticate to the authentication device 106. The adversary device 110 can capture the authentication signal 112 and can execute a signal converter module 118 to convert the authentication signal 112 from a signal having signal characteristics that, after propagating through the body of the user 102, are modified to be representative of the unique body signature of the user 102 to a signal having signal characteristics that, after propagating through the body of the adversary 104, are modified to be representative of the unique body signature of the user 102 (i.e., the modified authentication signal 120). The authentication device 106 can receive the modified authentication signal 120 from the body of the adversary 104 and can authenticate the adversary 104 due to the conversion performed by the signal converter module 118 of the adversary device 110 to create a signal having signal characteristics that, after propagating through the body of the adversary 104, are modified to form the modified authentication signal 120 that is representative of the unique body signature of the user 102. The adversary 104 can then access the authentication device 106, another device, and/or area as the case may be.

The authentication device 106, in some embodiments, is or includes a desktop computer, a laptop computer, a notebook computer, a tablet computer, or a netbook computer; a mobile telephone, a smartphone, or a feature phone; a video game system; a set-top box; a vehicle computing system; a smart watch; a personal tracker; a safety device; a music playback device; a video playback device; an internet appliance; a television, a monitor, a projector, or other display device; a personal digital assistant ("PDA"); a keyboard, a keypad, a track pad, a touch pad, a mouse, a trackball, a joystick, a video game controller, a motion control device, a remote control, or other input device; headphones, speakers, or other audio output device; a hands-free communication system; a hearing aid; a door entry mechanism (e.g., a door knob); a key fob; an article of clothing such as a wallet, a purse, a bag, a backpack, an earring, a necklace, a watch, a bracelet, an anklet, a ring, a belt, or a holster; combinations thereof, or the like. In some embodiments, the authentication device 106 authenticates one or more users to access one or more of the aforementioned devices. In some embodiments, the authentication device 106 is utilized to provide authenticated access to a restricted area such as a building, room, outdoor area, or the like. It should be understood that the functionality of the authentication device 106 can be provided by a single device, by two or more similar devices, and/or by two or more dissimilar devices.

The user device 108, in some embodiments, is or includes a desktop computer, a laptop computer, a notebook computer, a tablet computer, or a netbook computer; a mobile telephone, a smartphone, or a feature phone; a video game system; a set-top box; a vehicle computing system; a smart watch; a personal tracker; a safety device; a music playback device; a video playback device; an internet appliance; a television, a monitor, a projector, or other display device; a PDA; combinations thereof, or the like. It should be understood that the functionality of the user device 108 can be provided by a single device, by two or more similar devices, and/or by two or more dissimilar devices.

The illustrated user device 108 includes the signal generator module 114. The signal generator module 114 can be executed by one or more processors of the user device 108 (not illustrated in FIG. 1A, but illustrated and described below, for example, with reference to FIG. 8). The signal generator module 114, in some embodiments, is included in an operating system of the user device 108 and is accessible by one or more applications to cause the signal generator module 114 to perform one or more operations, such as generating the authentication signal 112. In some other embodiments, the signal generator module 114 is a stand-alone application or is included in one or more other applications.

The signal generator module 114 can generate the authentication signal 112 and send the authentication signal 112 to the user device transmitter 116. The user device transmitter 116 can transmit the authentication signal 112 to the body of the user 102, which may be intercepted by the adversary device 110 as in the illustrated spoofing attack of FIG. 1A. The user device transmitter 116, in some embodiments, is a vibration sensor that vibrates in accordance with the authentication signal 112 to send vibrations through one or more bones of the body of the user 102 (or the adversary 104 during the illustrated spoofing attack) in accordance with a bone conduction technique. The vibration sensor may be a piezoelectric transducer, such as a contact microphone, another electro-acoustic transducer, or a combination thereof.

The adversary device 110, in some embodiments, is or includes a desktop computer, a laptop computer, a notebook computer, a tablet computer, or a netbook computer; a mobile telephone, a smartphone, or a feature phone; a video game system; a set-top box; a vehicle computing system; a smart watch; a personal tracker; a safety device; a music playback device; a video playback device; an internet appliance; a television, a monitor, a projector, or other display device; a PDA; combinations thereof, or the like. It should be understood that the functionality of the user device 108 can be provided by a single device, by two or more similar devices, and/or by two or more dissimilar devices.

In some embodiments, the adversary device 110 is a remote recording device. For example, the adversary device 110 may be a laser device that can transmit a laser beam to the authentication device 106 and/or to a surface that is proximate to the authenticate device 106. The laser beam can be encoded with vibrations propagating through the authentication device 106 and/or the surface as a result of an authentication signal output from the body of the user 102. The laser beam can bounce off of the authentication device 106 and/or the surface and return to the adversary device 110. The adversary device 110 can extract the authentication signal output from the body of the user 102 and use the extracted signal to authenticate to the authentication device 106.

The illustrated adversary device 110 includes the signal converter module 118. The signal converter module 118 can be executed by one or more processors of the adversary device 110 (not illustrated in FIG. 1A, but illustrated and described below, for example, with reference to FIG. 8). The signal converter module 118, in some embodiments, is included in an operating system of the adversary device 110 and is accessible by one or more applications to cause the signal converter module 118 to perform one or more operations, such as converting the authentication signal 112 as described above. In some other embodiments, the signal converter module 118 is a stand-alone application or is included in one or more other applications.

FIG. 1A illustrates one user 102, one adversary 104, one authentication device 106, one user device 108, one adversary device 110, one authentication signal 112, one signal generator module 114, one user device transmitter 116, one signal converter module 118, one modified authentication signal 120, and one authentication device receiver 122. It should be understood, however, that various implementations of the operating environment 100 includes multiple authentication devices 106, multiple user devices 108, multiple adversary devices 110, multiple authentication signals 112, multiple signal generator modules 114, multiple user device transmitters 116, multiple signal converter modules 118, multiple modified authentication signals 120, and/or multiple authentication device receivers 122. Moreover, although only one user and one adversary are illustrated, more than one user and/or more than one adversary may be involved in a particular implementation of the operating environment 100. As such, the illustrated example should be understood as being illustrative, and should not be construed as being limiting in any way.

Turning now to FIG. 1B, aspects of another illustrative spoofing attack that can be prevented using the concepts and technologies disclosed herein will be described. The operating environment 100 shown in FIG. 1B includes the user 102, the adversary 104, the authentication device 106, the user device 108, the adversary device 110, the authentication signal 112, the signal generator module 114, the user device transmitter 116, the signal converter module 118, the modified authentication signal 120, and the authentication device receiver 122 described above with reference to FIG. 1A. In FIG. 1B, however, the adversary device 110 is positioned between the body of the adversary 104 and the authentication device 106 instead of between the user device 108 and the body of the adversary 104. As such, the adversary device 110 receives the authentication signal 112 as modified by the body of the adversary 104 and executes the signal converter module 118 to create the modified authentication signal 120, which appears to the authentication device 106 as if the modified authentication signal 120 was output from the body of the user 102.

Figure 2:
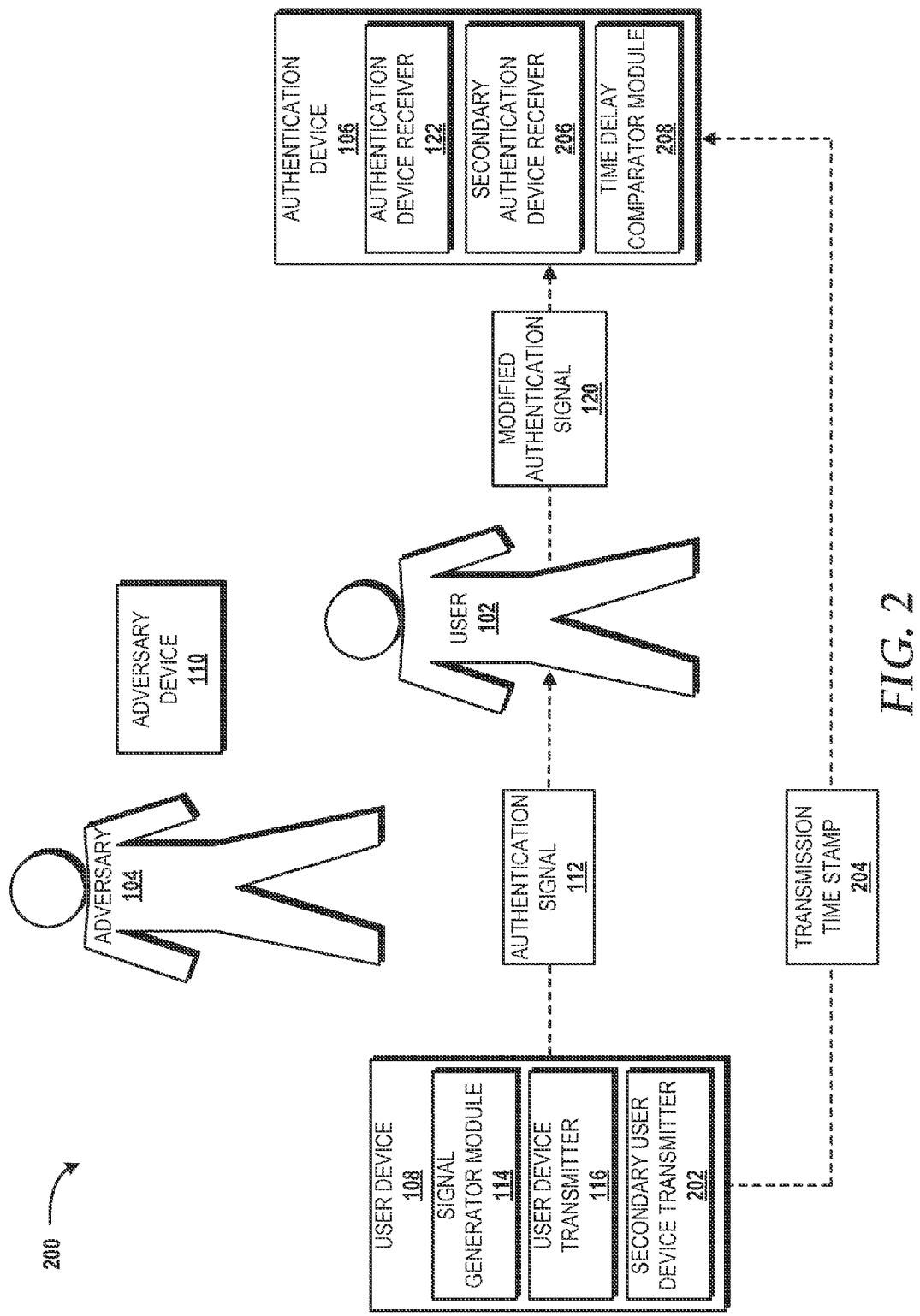
FIG. 2 is a block diagram illustrating aspects of an operating environment for preventing a bone conduction spoofing attack, according to an illustrative embodiment.

Turning now to FIG. 2, a block diagram illustrating aspects of an operating environment 200 for preventing a bone conduction spoofing attack, such as the bone conduction spoofing attacks described above with reference to FIGS. 1A and 1B, will be described, according to an illustrative embodiment. The operating environment 200 shown in FIG. 2 includes the user 102, the adversary 104, the authentication device 106, the user device 108, the adversary device 110, the authentication signal 112, the signal generator module 114, the user device transmitter 116, the modified authentication signal 120, and the authentication device receiver 122 described above with reference to FIG. 1A. In the illustrated example, the adversary 104 is attempting to spoof the user 102 using the adversary device 110 as in the example spoofing attacks described above.

To prevent the adversary 104 from successfully spoofing the user 102, the user device 108 shown in FIG. 2 includes a secondary user device transmitter 202. The secondary user device transmitter 202 can include a wireless or wired transmitter that utilizes any wireless or wired communications technology to transmit a transmission time stamp 204 to a secondary authentication device receiver 206 of the authentication device 106 that uses the same wireless or wired communications to receive the transmission time stamp 204. In some embodiments, the secondary user device transmitter 202 and the secondary authentication device receiver 206 communicate via WI-FI, WIMAX, BLUETOOTH, cellular technologies, infrared, infrared data association ("IRDA"), near-field communications ("NFC"), ZIGBEE, other radio frequency ("RF") technologies, wireless universal serial bus ("USB"), FIREWIRE, Ethernet, a proprietary technology, combinations thereof, or the like. Those skilled in the art will appreciate that the user device 108 may transmit the transmission time stamp 204 to the authentication device 106 via other communication technologies that are out-of-band with respect to communications between the user device 108 and the authentication device 106 via the user device transmitter 116 and the authentication device receiver 122, respectively. As such, the example technologies described above should not be construed as being limiting in any way.

The transmission time stamp 204 indicates the time at which the user device transmitter 116 begins transmission of the authentication signal 112 to the body of the user 102. The authentication device 106 can execute a time delay comparator module 208 to compare the transmission time stamp 204 to a transmission time for the authentication signal 112 and/or a transmission time threshold value known by the authentication device 106. In some embodiments, the transmission time is estimated by the authentication device 106. In some embodiments, the transmission time is stored by the authentication device 106 based upon one or more previous successful authentication attempts made by the user device 108 to authenticate the user 102 to the authentication device 106 via bone conduction-based authentication. In these embodiments, if the transmission time stamp 204 exceeds the transmission time, the authentication device 106 can determine that the authentication signal 112 has been compromised, such as by the adversary device 110, and can deny authentication to prevent the adversary 104 from gaining access. In some other embodiments, the authentication device 106 stores a transmission time threshold value. In these embodiments, if the transmission time stamp 204 indicates a time that meets or exceeds the transmission time threshold value, the authentication device 106 can determine that the authentication signal 112 has been compromised, such as by the adversary device 110, and can deny authentication to prevent the adversary 104 from gaining access.

The time delay comparator module 208 can be executed by one or more processors of the authentication device 106 (not illustrated in FIG. 2, but illustrated and described below, for example, with reference to FIG. 8). The time delay comparator module 208, in some embodiments, is included in an operating system of the authentication device 106 and is accessible by one or more applications to cause the time delay comparator module 208 to perform one or more operations, such as comparing the transmission time stamp 204 to an estimated or stored transmission time or to a transmission time threshold value as described above. In some other embodiments, the time delay comparator module 208 is a stand-alone application or is included in one or more other applications.

Figure 3:
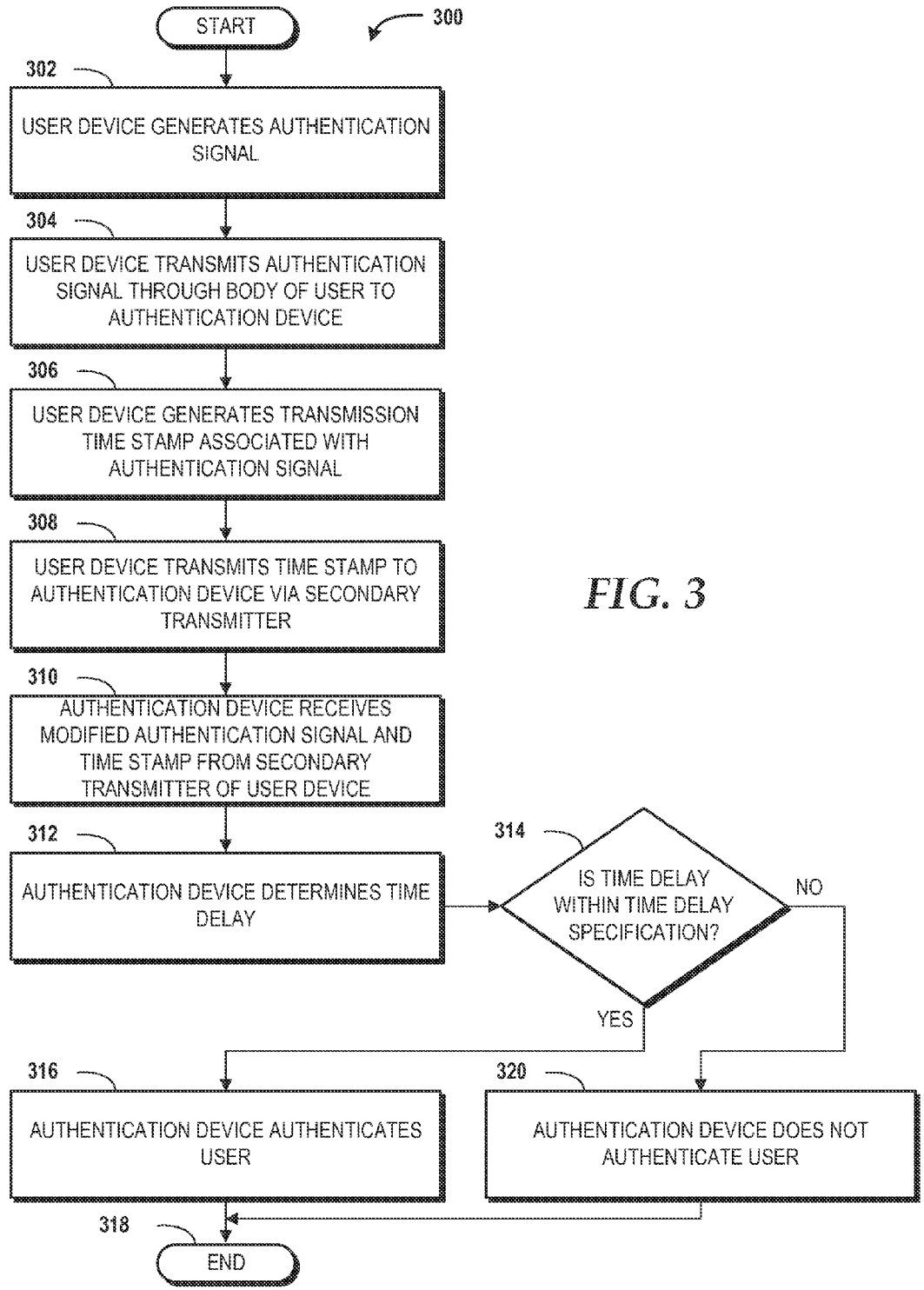
FIG. 3 is a flow diagram illustrating aspects of a method for preventing a bone conduction spoofing attack, according to an illustrative embodiment.

Turning now to FIG. 3, aspects of a method 300 for preventing a bone conduction spoofing attack, such as the bone conduction spoofing attacks described above with reference to FIGS. 1A and 1B, will be described in detail, according to an illustrative embodiment. It should be understood that the operations of the methods are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in their respective entireties. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including the authentication device 106, the user device 108, the adversary device 110, single-processor or multiprocessor systems, minicomputers, mainframe computers, personal computers, hand-held computing devices, microprocessor-based, programmable consumer electronics, other devices and systems disclosed herein, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof refers to causing a processor of a computing system or device, such as the authentication device 106, the user device 108, the adversary device 110, another device disclosed herein, or another system disclosed herein, to perform one or more operations and/or causing the processor to direct other components of the computing system or device to perform one or more of the operations.

For purposes of illustrating and describing some of the concepts of the present disclosure, the methods disclosed herein are described as being performed, at least in part, by the authentication device 106, the user device 108, and/or other devices disclosed herein, where indicated, via execution of one or more software modules and/or software applications. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 will be described with reference to FIG. 3 and further reference to FIG. 2. The method 300 begins at operation 302, where the user device 108 generates the authentication signal 112. From operation 302, the method 300 proceeds to operation 304, where the user device 108 transmits the authentication signal 112 through the body of the user 102 to the authentication device 106 via the user device transmitter 116. From operation 304, the method 300 proceeds to operation 306, where the user device 108 generates the transmission time stamp 204 associated with the transmission of the authentication signal via the user device transmitter 116 at operation 304.

From operation 306, the method 300 proceeds to operation 308, where the user device 108 transmits the transmission time stamp 204 to the authentication device 106 via the secondary user device transmitter 202. From operation 308, the method 300 proceeds to operation 310, where the authentication device 106 receives the modified authentication signal 120 from the body of the user 102 or, if the adversary 104 has successfully spoofed the user 102, from the body of the adversary 104.

From operation 310, the method 300 proceeds to operation 312, where the authentication device 106 determines a time delay, if any, between the receipt of the modified authentication signal 120 and the time indicated in the transmission time stamp 204. From operation 312, the method 300 proceeds to operation 314, where the authentication device 106 executes the time delay comparator module 208 to compare the time delay determined at operation 312 to a time delay specification to determine whether the time delay is within the time delay specification. The time delay specification, in some embodiments, includes an estimated or stored transmission time or a transmission time threshold value as described above. If the authentication device 106 determines, at operation 314, that the time delay is within the time delay specification, the method 300 proceeds to operation 316, where the authentication device 106 authenticates the user 102. If, however, the authentication device 106 determines, at operation 314, that the time delay is not within the time delay specification, the method 300 proceeds to operation 320, where the authentication device 106 does not authenticate the user 102.

From either operation 316 or operation 320, the method 300 proceeds to operation 318. The method 300 ends at operation 318.

Figure 4:
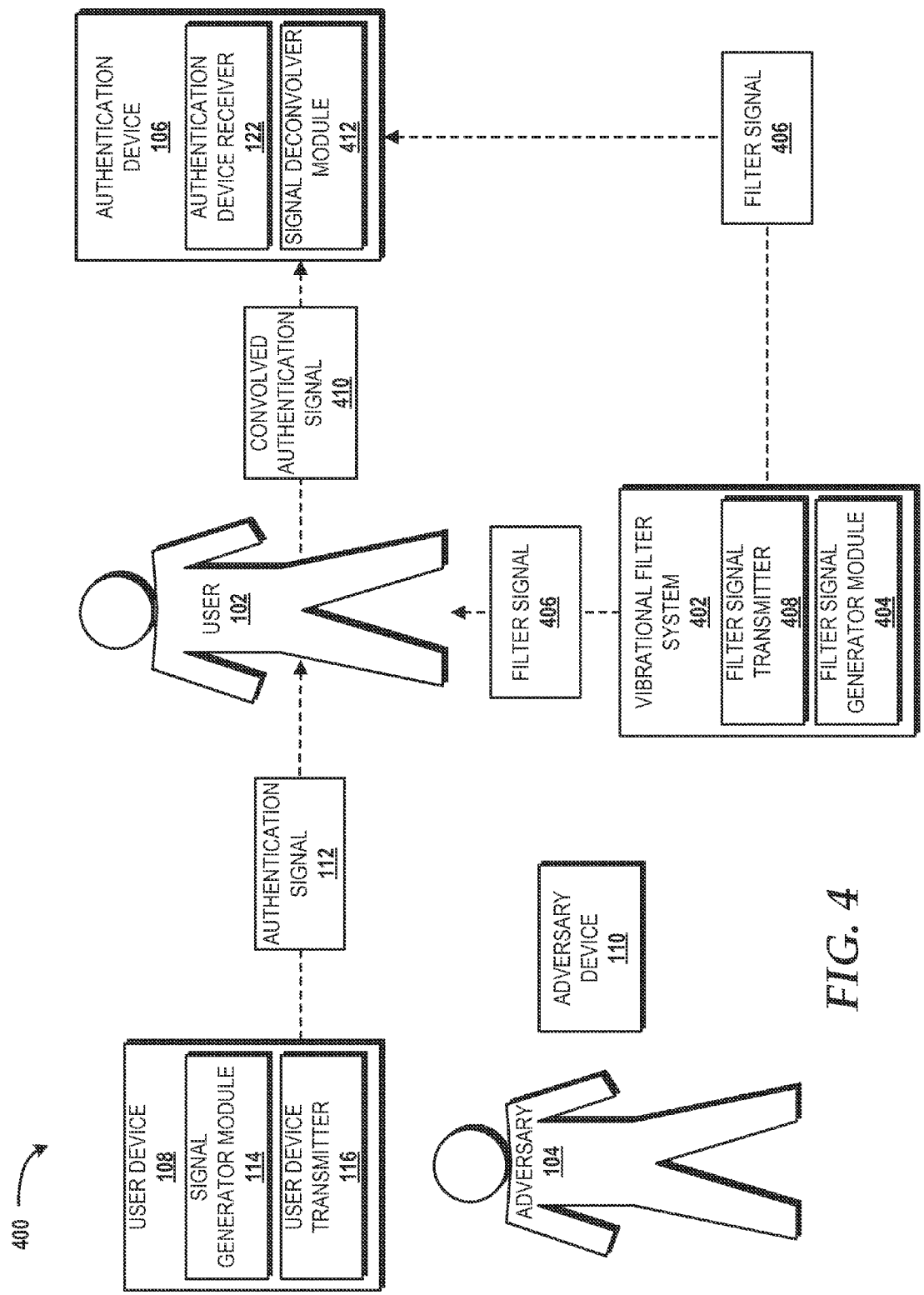
FIG. 4 is a block diagram illustrating aspects of another operating environment for preventing a bone conduction spoofing attack, according to an illustrative embodiment.

Turning now to FIG. 4, a block diagram illustrating aspects of another operating environment 400 for preventing a bone conduction spoofing attack, such as the bone conduction spoofing attacks described above with reference to FIGS. 1A and 1B, will be described, according to an illustrative embodiment. The operating environment 400 shown in FIG. 4 includes the user 102, the adversary 104, the authentication device 106, the user device 108, the adversary device 110, the authentication signal 112, the signal generator module 114, the user device transmitter 116, and the authentication device receiver 122 described above with reference to FIG. 1A. In the illustrated example, the adversary 104 is attempting to spoof the user 102 using the adversary device 110 as in the example spoofing attacks described above.

To prevent the adversary 104 from successfully spoofing the user 102, a vibrational filter system 402 can execute a filter signal generator module 404 to generate a filter signal 406. The filter signal 406 can be sent to the body of the user 102 via a filter signal transmitter 408. The filter signal 406 is used to encrypt the authentication signal 112 within the body of the user 102 so that, if intercepted by the adversary device 110, the output of the body of the user 102 to the authentication device 106 cannot be used by the adversary 104 to spoof the user 102. The filter signal 406, in some embodiments, encrypts the authentication signal 112 by modifying one or more signal characteristics of the authentication signal 112 to form a convolved authentication signal 410, which is received by the authentication device receiver 122 of the authentication device 106. The authentication device 106 can execute a signal deconvolver module 412 to deconvolve the convolved authentication signal 410 to isolate the authentication signal 112 as modified by the body of the user 102 and use the unique body signature contained therein to authenticate the user 102 to the authentication device 106.

The vibrational filter system 402, in some embodiments, is or includes a desktop computer, a laptop computer, a notebook computer, a tablet computer, or a netbook computer; a mobile telephone, a smartphone, or a feature phone; a video game system; a set-top box; a vehicle computing system; a smart watch; a personal tracker; a safety device; a music playback device; a video playback device; an internet appliance; a television, a monitor, a projector, or other display device; a PDA; combinations thereof, or the like. It should be understood that the functionality of the vibrational filter system 402 can be provided by a single device, by two or more similar devices, and/or by two or more dissimilar devices.

The filter signal generator module 404 can be executed by one or more processors of the vibrational filter system 402 (not illustrated in FIG. 4, but illustrated and described, for example, below with reference to FIG. 8). The filter signal generator module 404, in some embodiments, is included in an operating system of the vibrational filter system 402 and is accessible by one or more applications to cause the filter signal generator module 404 to perform one or more operations, such as generating the filter signal 406 as described above. In some other embodiments, the filter signal generator module 404 is a stand-alone application or is included in one or more other applications.

The filter signal transmitter 408, in some embodiments, is a vibration sensor that vibrates in accordance with the filter signal 406 to send vibrations through one or more bones of the body of the user 102 in accordance with a bone conduction technique. The vibration sensor may be a piezoelectric transducer, such as a contact microphone, another electro-acoustic transducer, or a combination thereof. The filter signal transmitter 408 may additionally send the filter signal 406 directly to the authentication device receiver 122 of the authentication device 106.

In some other embodiments, the filter signal transmitter 408 is or includes a secondary transmitter that utilizes any wireless or wired communications technology to transmit the filter signal 406 to the authentication device 106 via the authentication device receiver 122 or another receiver, such as the secondary authentication device receiver 206 described herein above with reference to FIG. 2. In some embodiments, the filter signal transmitter 408 transmits the filter signal to the authentication device 106 via WI-FI, WIMAX, BLUETOOTH, cellular technologies, infrared, IRDA, NFC, ZIGBEE, other RF technologies, wireless USB, FIREWIRE, Ethernet, a proprietary technology, combinations thereof, or the like. Those skilled in the art will appreciate that the vibrational filter system 402 may transmit the filter signal 406 to the authentication device 106 via other communication technologies that are out-of-band with respect to communications between the user device 108 and the authentication device 106. As such, the example technologies described above should not be construed as being limiting in any way.

The filter signal 406 can be sent to the authentication device 106 prior to, during, or after transmission of the filter signal 406 to the body of the user 102. In some embodiments, the vibrational filter system 402 is a server computer operating remotely from the authentication device 106. In any case, by using the vibrational filter system 402 to introduce the filter signal 406 to the body of the user 102, an additional level of security is provided above and beyond merely encrypting the authentication signal 112 prior to transmission to the body of the user 102. Moreover, the implementation shown in FIG. 4 separates the two components of an authentication signal observed at the receiving system (i.e., the authentication device 106) into two sources. If one of the sources is compromised, the observed signal at the receiving system will still be difficult to separate into components because the unknown signal component and the effects of the body of the user 102 on the authentication signal may be difficult to differentiate.

Figure 5:
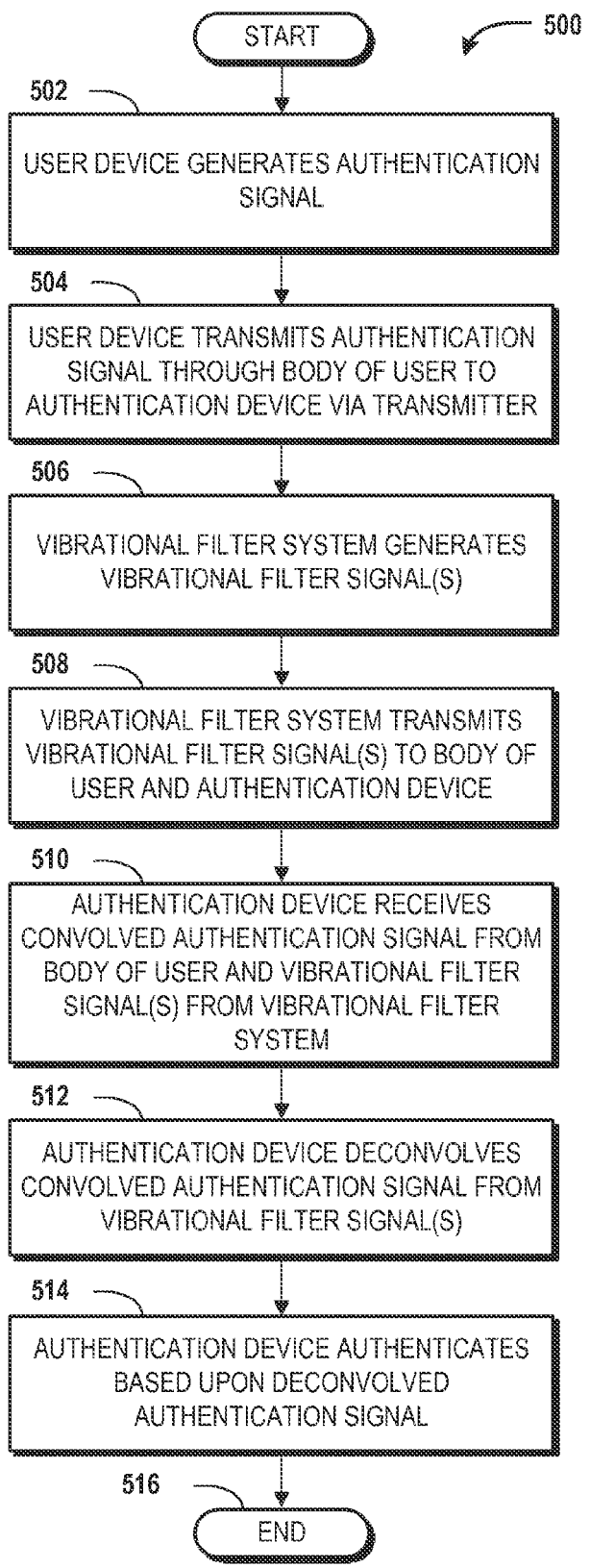
FIG. 5 is a flow diagram illustrating aspects of another method for preventing a bone conduction spoofing attack, according to an illustrative embodiment.

Turning now to FIG. 5, aspects of a method 500 for preventing a bone conduction spoofing attack, such as the bone conduction spoofing attacks described above with reference to FIGS. 1A and 1B, will be described in detail, according to an illustrative embodiment. The method 500 will be described with reference to FIG. 5 and further reference to FIG. 4. The method 500 begins at operation 502, where the user device 108 generates the authentication signal 112. From operation 502, the method 500 proceeds to operation 504, where the user device 108 transmits the authentication signal 112 through the body of the user 102 to the authentication device 106 via the user device transmitter 116.

From operation 504, the method 500 proceeds to operation 506, where the vibrational filter system 402 executes the filter signal generator module 404 to generate one or more vibrational filter signals, such as the filter signal 406. From operation 506, the method 500 proceeds to operation 508, where the vibrational filter system 402 transmits, via the filter signal transmitter 408, the filter signal 406 to the body of the user 102 and to the authentication device 106. The vibrational filter system 402 may transmit the filter signal 406 to the authentication device 106 before, during, or after transmission of the filter signal 406 to the body of the user 102.

From operation 508, the method 500 proceeds to operation 510, where the authentication device 106 receives the convolved authentication signal 410 from the body of the user 102. The authentication device 106 also receives, at operation

510, the filter signal 406. The filter signal 406 may be received by the authentication device 106 before or after the convolved authentication signal 410 is received. The filter signal 406 may be received by the authentication device 106 simultaneously with the convolved authentication signal 410.

From operation 510, the method 500 proceeds to operation 512, where the authentication device 106 executes the signal deconvolver module 412 to deconvolve the authentication signal 112 as modified by the body of the user 102 from the filter signal 406. From operation 512, the method 500 proceeds to operation 514, where the authentication device 106 authenticates the user 102 based upon the deconvolved authentication signal. From operation 514, the method 500 proceeds to operation 516. The method 500 ends at operation 516.

Figure 6:
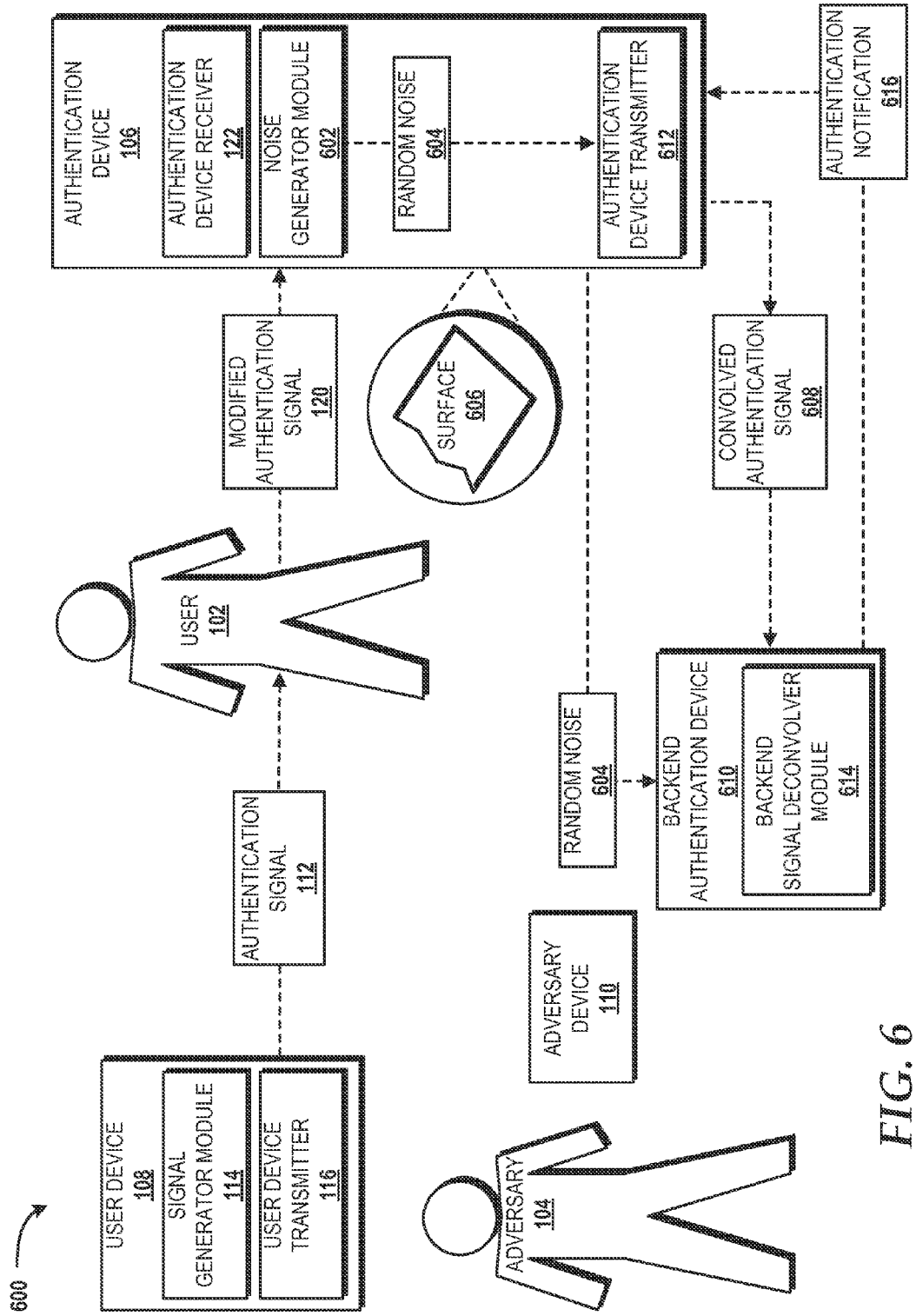
FIG. 6 is a block diagram illustrating aspects of another operating environment for preventing a bone conduction spoofing attack, according to an illustrative embodiment.

Turning now to FIG. 6, a block diagram illustrating aspects of another operating environment 600 for preventing a bone conduction spoofing attack, such as the bone conduction spoofing attacks described above with reference to FIGS. 1A and 1B, will be described, according to an illustrative embodiment. The operating environment 600 shown in FIG. 6 includes the user 102, the adversary 104, the authentication device 106, the user device 108, the adversary device 110, the authentication signal 112, the signal generator module 114, the user device transmitter 116, the modified authentication signal 120, and the authentication device receiver 122 described above with reference to FIG. 1A. In the illustrated example, the adversary 104 is attempting to spoof the user 102 using the adversary device 110 as in the example spoofing attacks described above.

To prevent the adversary 104 from successfully spoofing the user 102, the authentication device 106 can execute a noise generator module 602 to generate random noise 604. The random noise 604 can be output by the noise generator module 602 such that the random noise 604 causes vibration through a surface 606, which may be a housing or other component of the authentication device 106 and/or something with which the authentication device 106 is in physical contact. The random noise 604 can convolve with the modified authentication signal 120 to yield a convolved authentication signal 608 that can be received by a backend authentication device 610. The backend authentication device 610, in some embodiments, sends a laser beam to the surface 606 and receives the convolved authentication signal 608 via the laser beam. The backend authentication device 610, in some other embodiments, receives the convolved authentication signal 608 from one or more sensors (not shown) on the surface 606. The backend authentication device 610 can also receive the random noise 604 from an authentication device transmitter 612 of the authentication device 106. The backend authentication device 610 can execute a backend signal deconvolver module 614 to remove the random noise 604 from the convolved authentication signal 608 to isolate the modified authentication signal 120 and to authenticate the user 102.

In the illustrated embodiment, the backend authentication device 610 can generate an authentication notification 616 and send the authentication notification 616 to the authentication device 106. The authentication notification 616 can be used to notify the authentication device 106 of whether or not the user 102 is authenticated to access the authentication device 106.

The noise generator module 602 can be executed by one or more processors of the authentication device 106 (not illustrated in FIG. 6, but illustrated and described, for example, below with reference to FIG. 8). The noise generator module 602, in some embodiments, is/are included in an operating system of the authentication device 106 and is/are accessible by one or more applications to cause the authentication device 106 to perform one or more operations. In some other embodiments, the noise generator module 602 is a stand-alone application or is included in one or more other applications.

The authentication device transmitter 612, in some embodiments, is a vibration sensor. The vibration sensor may be a piezoelectric transducer, such as a contact microphone, another electro-acoustic transducer, or a combination thereof. In some other embodiments, the authentication device transmitter 612 includes a transmitter that utilizes any wireless or wired communications technology, such as, but not limited to, WI-FI, WIMAX, BLUETOOTH, cellular technologies, infrared, IRDA, NFC, ZIGBEE, other RF technologies, wireless USB, FIREWIRE, Ethernet, a proprietary technology, combinations thereof, or the like.

The backend authentication device 610, in some embodiments, is or includes a desktop computer, a laptop computer, a notebook computer, a tablet computer, or a netbook computer; a mobile telephone, a smartphone, or a feature phone; a video game system; a set-top box; a vehicle computing system; a smart watch; a personal tracker; a safety device; a music playback device; a video playback device; an internet appliance; a television, a monitor, a projector, or other display device; a PDA; combinations thereof, or the like. In some embodiments, the backend authentication device 610 is a server computer operating remotely from the authentication device 106. It should be understood that the functionality of the backend authentication device 610 can be provided by a single device, by two or more similar devices, and/or by two or more dissimilar devices.

The backend signal deconvolver module 614 can be executed by one or more processors of the backend authentication device 610 (not illustrated in FIG. 6, but illustrated and described, for example, below with reference to FIG. 8). The backend signal deconvolver module 614, in some embodiments, is included in an operating system of the backend authentication device 610 and is accessible by one or more applications to cause the backend signal deconvolver module 614 to perform one or more operations, such as deconvolving the convolved authentication signal 608 as described above. In some other embodiments, the backend signal deconvolver module 614 is a stand-alone application or is included in one or more other applications.

Figure 7:
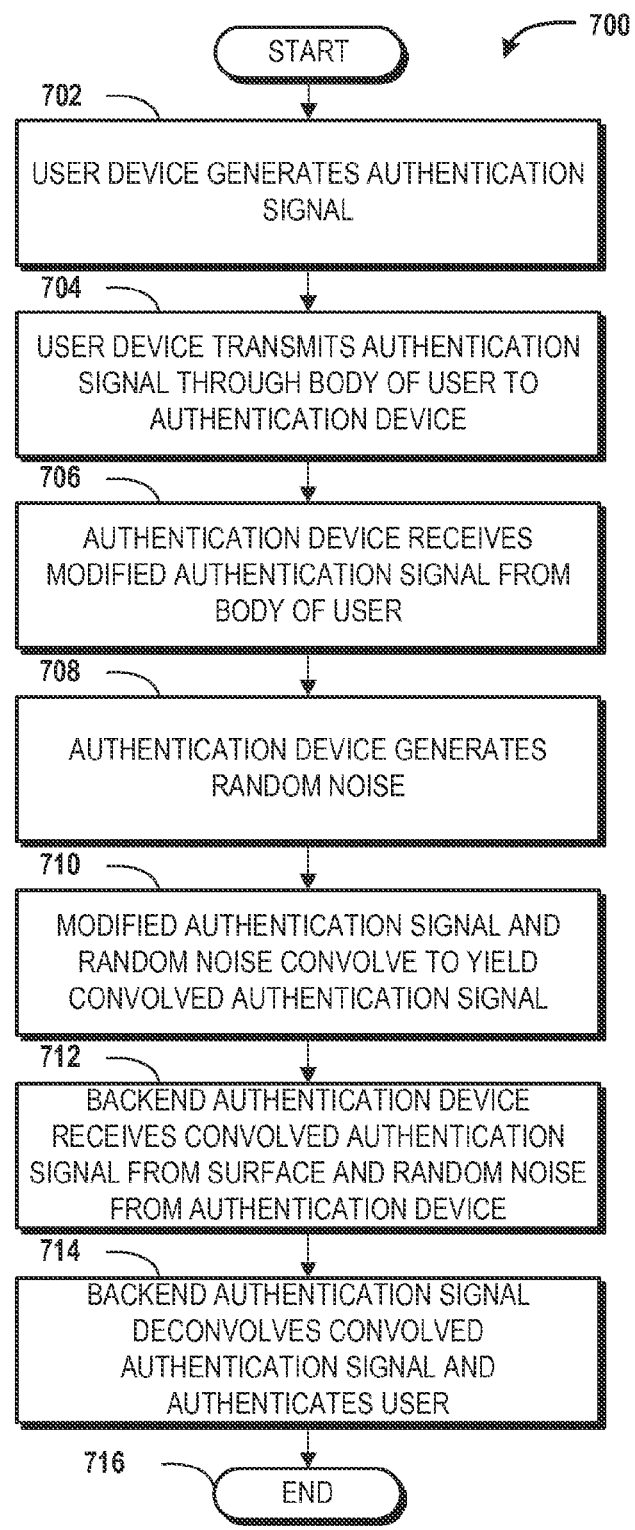
FIG. 7 is a flow diagram illustrating aspects of another method for preventing a bone conduction spoofing attack, according to an illustrative embodiment.

Turning now to FIG. 7, aspects of a method 700 for preventing a bone conduction spoofing attack, such as the bone conduction spoofing attacks described above with reference to FIGS. 1A and 1B, will be described in detail, according to an illustrative embodiment. The method 700 will be described with reference to FIG. 7 and further reference to FIG. 6. The method 700 begins at operation 702, where the user device 108 generates the authentication signal 112. From operation 702, the method 700 proceeds to operation 704, where the user device 108 transmits the authentication signal 112 through the body of the user 102 to the authentication device 106 via the user device transmitter 116.

From operation 704, the method 700 proceeds to operation 706, where the authentication device 106 receives the modified authentication signal 120 from the body of the user 102. From operation 706, the method 700 proceeds to operation 708, where the authentication device 106 executes the noise generator module 602 to generate the random noise 604. From operation 708, the method 700 proceeds to operation 710, where the modified authentication signal 120 and the random noise 604 convolve to yield the convolved authentication signal 608. From operation 710, the method 700 proceeds to operation 712, where the backend authentication device 610 receives the convolved authentication signal 608 from the surface 606 and the random noise 604 from the authentication device 106.

From operation 712, the method 700 proceeds to operation 714, where the backend authentication device 610 executes the backend signal deconvolver module 614 to deconvolve the convolved authentication signal 608 to isolate the modified authentication signal 120 from the random noise 604. Also at operation 714, the backend authentication device 610 authenticates the user 102. In some embodiments, the backend authentication device 610 sends the authentication notification 616 to the authentication device 106 to notify the authentication device 106 of whether or not the user 102 is authenticated to access the authentication device 106. From operation 714, the method 700 proceeds to operation 716. The method 700 ends at operation 716.

Using the method 700, the adversary device 110 would receive a mix of the bone conduction signal from the user 102 (i.e., the modified authentication signal 120) as well as a second signal (i.e., the random noise 604) introduced by the authentication device 106. Since the adversary device 110 does not know the random noise 604, the adversary device 110 cannot deconvolve the convolved authentication signal 608 to isolate the modified authentication signal 120 from the convolved authentication signal 608 using the random noise 604.

Figure 8:
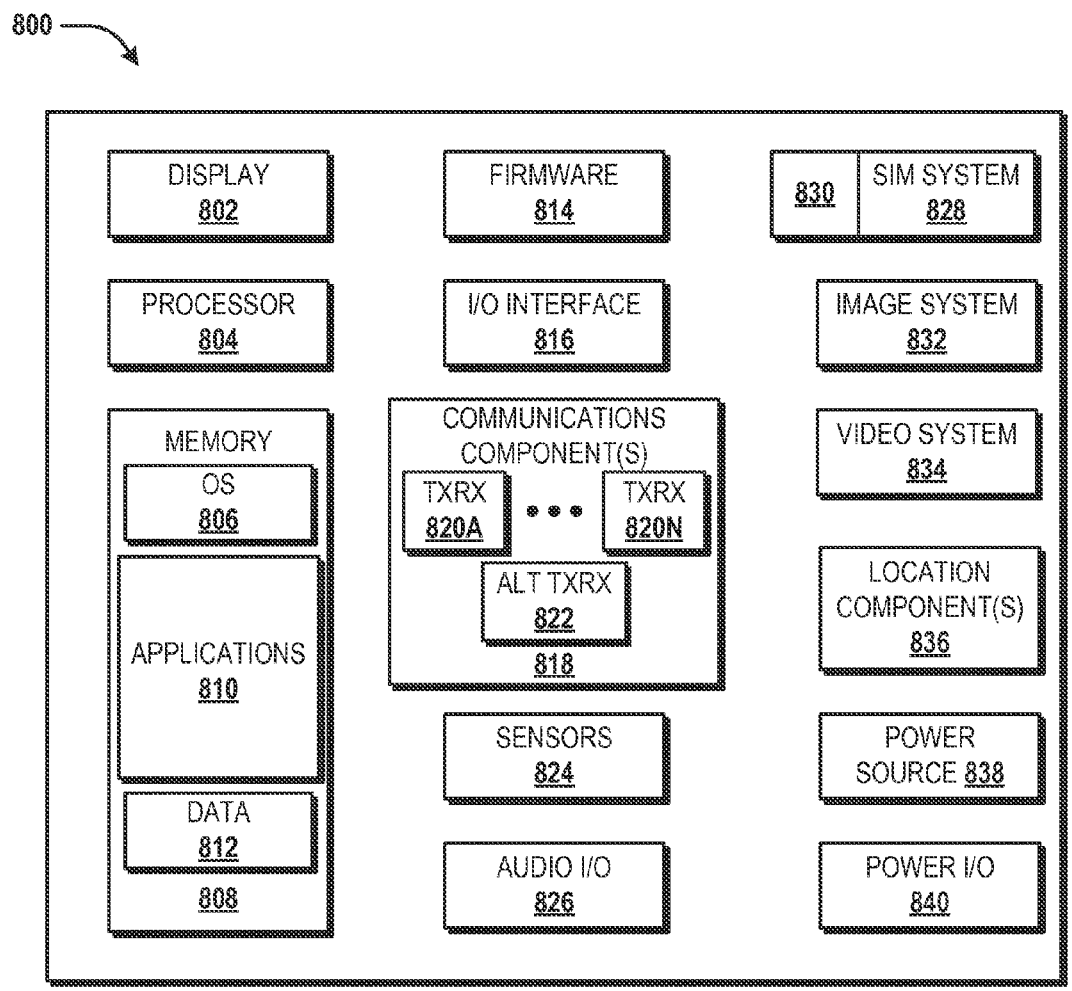
FIG. 8 is a block diagram illustrating an example mobile device capable of implementing aspects of the embodiments disclosed herein.

Turning now to FIG. 8, an illustrative mobile device 800 and components thereof will be described. In some embodiments, the authentication device 106, the user device 108, the adversary device 110, the vibrational filter system 402, and/or the backend authentication system 612, each of which is described above, can be configured as and/or can have an architecture similar or identical to the mobile device 800 described herein in FIG. 8. It should be understood, however, that the authentication device 106, the user device 108, the adversary device 110, the vibrational filter system 402, and/or the backend authentication system 612 may or may not include the functionality described herein with reference to FIG. 8. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements, text, images, video, advertisements, various prompts, virtual keypads and/or keyboards, messaging data, notification messages, metadata, internet content, device status, time, date, calendar data, device preferences, map and location data, combinations thereof, and the like. The mobile device 800 also can include a processor 804 and a memory or other data storage device ("memory") 808. The processor 804 can be configured to process data and/or can execute computer-executable instructions stored in the memory 808. The computer-executable instructions executed by the processor 804 can include, for example, an operating system 806, one or more applications 810, other computer-executable instructions stored in a memory 808, or the like. In some embodiments, the applications 810 also can include a UI application (not illustrated in FIG. 8).

The UI application can interface with the operating system 806 to facilitate user interaction with functionality and/or data stored at the mobile device 800 and/or stored elsewhere. In some embodiments, the operating system 806 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, viewing account information, answering/initiating calls, entering/deleting data, entering and setting user IDs and passwords for device access, configuring settings, manipulating address book content and/or settings, multimode interaction, interacting with other applications 810, and otherwise facilitating user interaction with the operating system 806, the applications 810, and/or other types or instances of data 812 that can be stored at the mobile device 800. The data 812 can include user preferences, user settings, and/or other data. The applications 810 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, the signal generator module 114, the signal converter module 118, the time delay comparator module 208, the signal deconvolver module 412, the filter signal generator module 404, the noise generator module 602, the backend signal deconvolver module 614, and/or portions thereof can be stored in the memory 808 and/or in a firmware 814, and can be executed or otherwise utilized by the processor 804. The firmware 814 also can store code for execution during device power up and power down operations. It can be appreciated that the firmware 814 can be stored in a volatile or non-volatile data storage device including, but not limited to, the memory 808 and/or a portion thereof.

The mobile device 800 also can include an input/output ("I/O") interface 816. The I/O interface 816 can be configured to support the input/output of data such as location information, user information, organization information, presence status information, user IDs, passwords, and application initiation (start-up) requests. In some embodiments, the I/O interface 816 can include a hardwire connection such as a USB port, a mini-USB port, a micro-USB port, an audio jack, a PS2 port, an IEEE 1384 ("FIREWIRE") port, a serial port, a parallel port, an Ethernet (RJ411) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using Global System for Mobile communication ("GSM"), Code Division Multiple Access ("CDMA"), CDMAONE, CDMA2000, Long-Term Evolution ("LTE"), and various other 2G, 2.5G, 3G, 4G, and greater generation technology standards. Moreover, the communications component 818 may facilitate communications over various channel access methods (which may or may not be used by the aforementioned standards) including, but not limited to, Time Division Multiple Access ("TDMA"), Frequency Division Multiple Access ("FDMA"), Wideband CDMA ("W-CDMA"), Orthogonal Frequency-Division multiplexing ("OFDM"), Space-Division Multiple Access ("SDMA"), and the like.

In addition, the communications component 818 may facilitate data communications using Generic Packet Radio Service ("GPRS"), Enhanced Date Rates for GSM Evolution ("EDGE"), the High-Speed Packet Access ("HSPA") protocol family, including High-Speed Downlink Packet Access ("HSDPA"), Enhanced Uplink ("EUL") or otherwise termed Highs-Speed Uplink Packet Access ("HSUPA"), HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, IRDA, NFC, other RF technologies, combinations thereof, and the like.

In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
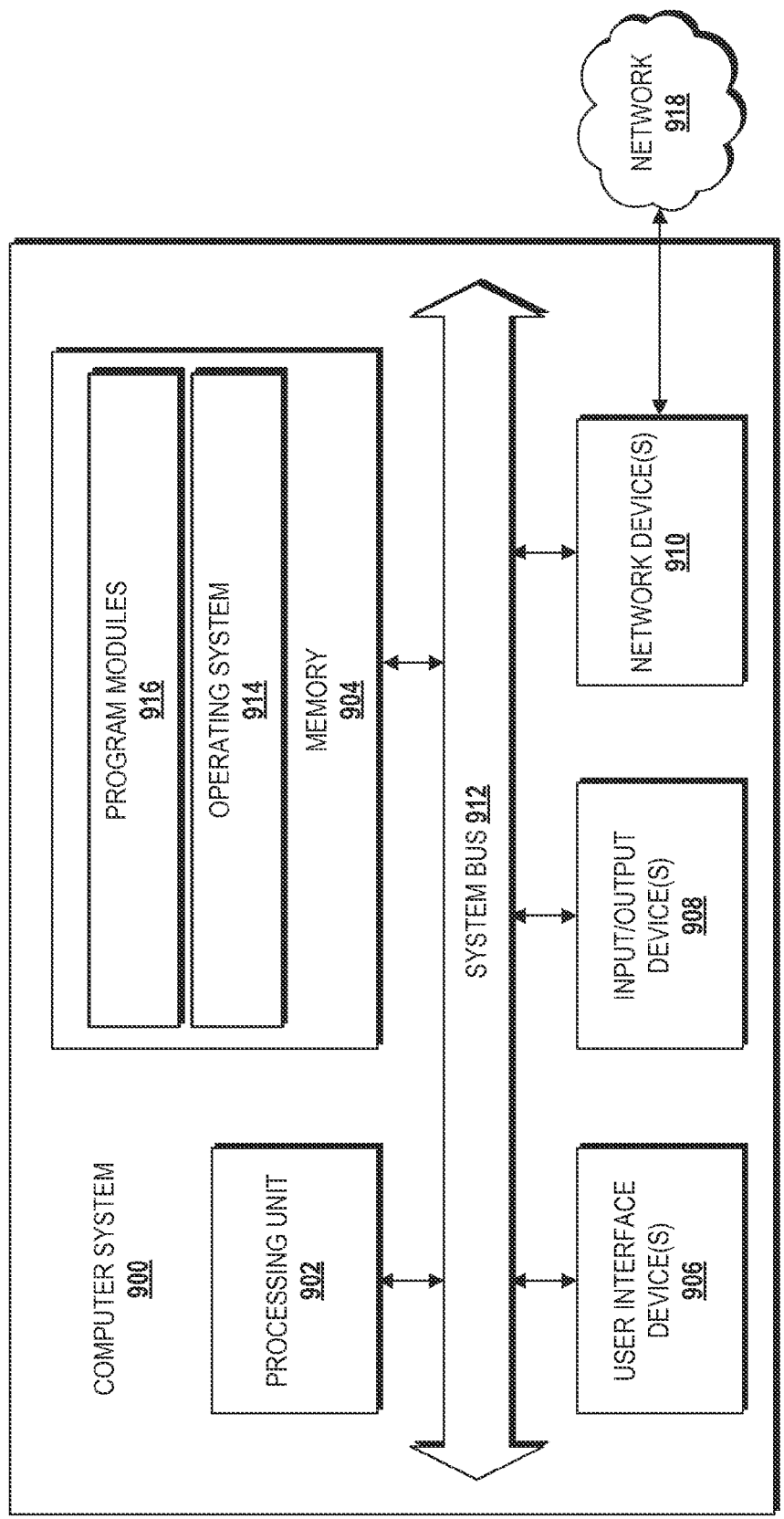
FIG. 9 is a block diagram illustrating an example computer system capable of implementing aspects of the embodiments presented herein.

FIG. 9 is a block diagram illustrating a computer system 900 configured to provide the functionality in accordance with various embodiments of the concepts and technologies disclosed herein. In some embodiments, the authentication device 106, the user device 108, the adversary device 110, the vibrational filter system 402, and/or the backend authentication system 612, each of which is described above, are configured to utilize an architecture that is the same as or similar to the architecture of the computer system 900. It should be understood, however, that modification to the architecture may be made to facilitate certain interactions among elements described herein.

The computer system 900 includes a processing unit 902, a memory 904, one or more user interface devices 906, one or more input/output ("I/O") devices 908, and one or more network devices 910, each of which is operatively connected to a system bus 912. The bus 912 enables bi-directional communication between the processing unit 902, the memory 904, the user interface devices 906, the I/O devices 908, and the network devices 910.

The processing unit 902 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 904 communicates with the processing unit 902 via the system bus 912. In some embodiments, the memory 904 is operatively connected to a memory controller (not shown) that enables communication with the processing unit 902 via the system bus 912. The memory 904 includes an operating system 914 and one or more program modules 916. The operating system 914 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 916 may include various software and/or program modules to perform the various operations described herein. The program modules 916 and/or other programs can be embodied in computer-readable media containing instructions that, when executed by the processing unit 902, perform one or more of the operations described herein. According to embodiments, the program modules 916 may be embodied in hardware, software, firmware, or any combination thereof. The program module 916 may include the signal generator module 114, the signal converter module 118, the time delay comparator module 208, the signal deconvolver module 412, the filter signal generator module 404, the noise generator module 602, and/or the backend signal deconvolver module 614.

By way of example, and not limitation, computer-readable media may include any available computer storage media or communication media that can be accessed by the computer system 900. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 900. In the claims, the phrase "computer storage medium" and variations thereof does not include waves or signals per se and/or communication media.

The user interface devices 906 may include one or more devices with which a user accesses the computer system 900. The user interface devices 906 may include, but are not limited to, computers, servers, personal digital assistants, cellular phones, or any suitable computing devices. The I/O devices 908 enable a user to interface with the program modules 916. In one embodiment, the I/O devices 908 are operatively connected to an I/O controller (not shown) that enables communication with the processing unit 902 via the system bus 912. The I/O devices 908 may include one or more input devices, such as, but not limited to, a keyboard, a mouse, or an electronic stylus. Further, the I/O devices 908 may include one or more output devices, such as, but not limited to, a display screen or a printer.

The network devices 910 enable the computer system 900 to communicate with other networks or remote systems via a network 918. Examples of the network devices 910 include, but are not limited to, a modem, a radio frequency ("RF") or infrared ("IR") transceiver, a telephonic interface, a bridge, a router, or a network card. The network 918 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 918 may be a wired network such as, but not limited to, a Wide Area Network ("WAN"), a wired LAN such as provided via Ethernet, a wired Personal Area Network ("PAN"), or a wired Metropolitan Area Network ("MAN").

Figure 10:
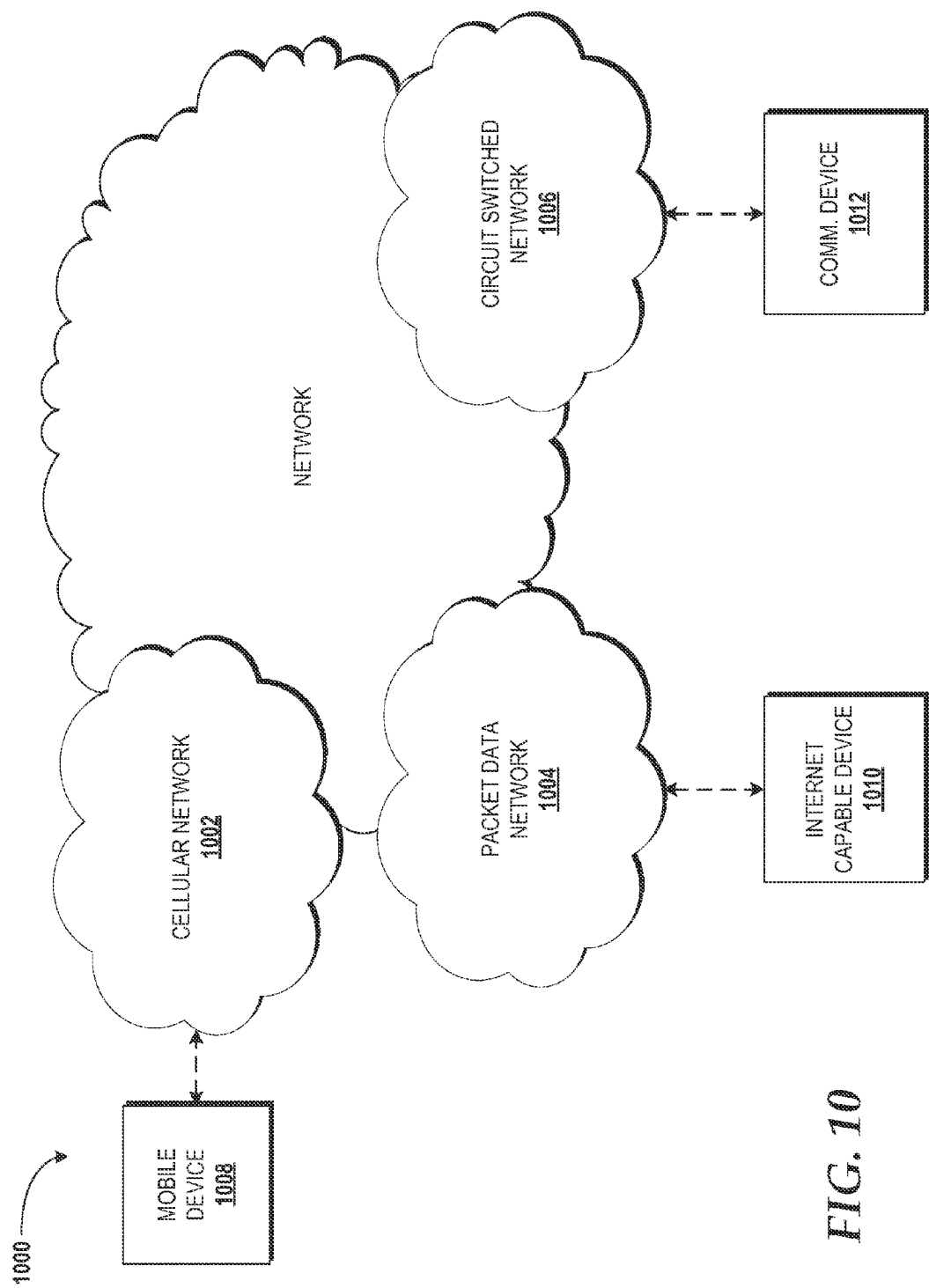
FIG. 10 schematically illustrates a network, according to an illustrative embodiment.

Turning now to FIG. 10, details of a network 1000 are illustrated, according to an illustrative embodiment. The network 1000 includes a cellular network 1002, a packet data network 1004, for example, the Internet, and a circuit switched network 1006, for example, a publicly switched telephone network ("PSTN"). The cellular network 1002 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1002 also includes radios and nodes for receiving and transmitting voice, data, and combinations thereof to and from radio transceivers, networks, the packet data network 1004, and the circuit switched network 1006.

A mobile communications device 1008, such as, for example, a cellular telephone, a user equipment, a mobile terminal, a PDA, a laptop computer, a handheld computer, the authentication device 106, the user device 108, the adversary device 110, the vibrational filter system 402, the backend authentication device 610, and combinations thereof, can be operatively connected to the cellular network 1002. The cellular network 1002 can be configured as a 2G GSM network and can provide data communications via GPRS and/or EDGE. Additionally, or alternatively, the cellular network 1002 can be configured as a 3G UMTS network and can provide data communications via the HSPA protocol family, for example, HSDPA, EUL (also referred to as HSUPA), and HSPA+. The cellular network 1002 also is compatible with 4G mobile communications standards such as LTE, or the like, as well as evolved and future mobile standards.

The packet data network 1004 includes various devices, for example, servers, computers, databases, and other devices in communication with another, as is generally known. The packet data network 1004 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1004 includes or is in communication with the Internet. The circuit switched network 1006 includes various hardware and software for providing circuit switched communications. The circuit switched network 1006 may include, or may be, what is often referred to as a plain old telephone system ("POTS"). The functionality of a circuit switched network 1006 or other circuit-switched network are generally known and will not be described herein in detail.

The illustrated cellular network 1002 is shown in communication with the packet data network 1004 and a circuit switched network 1006, though it should be appreciated that this is not necessarily the case. One or more Internet-capable devices 1010, for example, the authentication device 106, the user device 108, the adversary device 110, the vibrational filter system 402, the backend authentication device 610, a PC, a laptop, a portable device, or another suitable device, can communicate with one or more cellular networks 1002, and devices connected thereto, through the packet data network 1004. It also should be appreciated that the Internet-capable device 1010 can communicate with the packet data network 1004 through the circuit switched network 1006, the cellular network 1002, and/or via other networks (not illustrated).

As illustrated, a communications device 1012, for example, a telephone, facsimile machine, modem, computer, the authentication device 106, the user device 108, the adversary device 110, the vibrational filter system 402, the backend authentication device 610, or the like, can be in communication with the circuit switched network 1006, and therethrough to the packet data network 1004 and/or the cellular network 1002. It should be appreciated that the communications device 1012 can be an Internet-capable device, and can be substantially similar to the Internet-capable device 1010. In the specification, the network 1000 is used to refer broadly to any combination of the networks 1002, 1004, 1006. It should be appreciated that substantially all of the functionality described with reference to the network 1000 can be performed by the cellular network 1002, the packet data network 1004, and/or the circuit switched network 1006, alone or in combination with other networks, network elements, and the like.

Based on the foregoing, it should be appreciated that concepts and technologies directed to preventing spoofing attacks for bone conduction applications have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
 receiving, by an authentication device, a convolved authentication signal comprising
  a first signal that has propagated through a body of a user and is indicative of a unique body signature of the body of the user, wherein the first signal comprises an authentication signal that originated from a user device and has been modified by the unique body signature by way of propagation through the body of the user, and a second signal originating from a vibrational filter system, wherein the second signal causes the first signal to be encrypted within the body of the user to form the convolved authentication signal;

receiving, by the authentication device, the second signal directly from the vibrational filter system;

preventing an adversary from using the authentication signal to spoof the user to be authenticated by the authentication device by deconvolving the convolved authentication signal to isolate the unique body signature using the second signal that is received separate from the convolved authentication signal; and authenticating, by the authentication device, the user based upon the unique body signature.

2. The method of claim 1, wherein:
the second signal comprises a filter signal; and
the filter signal encrypts the first signal by modifying a signal characteristic of the first signal.

3. The method of claim 2, wherein the filter signal is sent by the vibrational filter system to the authentication device before transmission of the filter signal to the body.

4. The method of claim 2, wherein the filter signal is sent by the vibrational filter system to the authentication device during transmission of the filter signal to the body.

5. The method of claim 2, wherein the filter signal is sent by the vibrational filter system to the authentication device after transmission of the filter signal to the body.

6. An authentication device comprising:
a processor; and
a memory that stores instructions that, when executed by the processor, cause the processor to perform operations comprising:
receiving a convolved authentication signal comprising
a first signal that has propagated through a body of a user and is indicative of a unique body signature of the body of the user, wherein the first signal comprises an authentication signal that originated from a user device and has been modified by the unique body signature by way of propagation through the body of the user, and a second signal originating from a vibrational filter system, wherein the second signal causes the first signal to be encrypted within the body of the user to form the convolved authentication signal, receiving the second signal directly from the vibrational filter system, preventing an adversary from using the authentication signal to spoof the user to be authenticated by the authentication device by deconvolving the convolved authentication signal to isolate the unique body signature using the second signal that is received separate from the convolved authentication signal, and authenticating the user based upon the unique body signature.

7. The authentication device of claim 6, wherein:
the second signal comprises a filter signal; and
the filter signal encrypts the first signal by modifying a signal characteristic of the first signal.

8. The authentication device of claim 7, wherein the filter signal is sent by the vibrational filter system to the authentication device before transmission of the filter signal to the body.

9. The authentication device of claim 7, wherein the filter signal is sent by the vibrational filter system to the authentication device during transmission of the filter signal to the body.

10. The authentication device of claim 7, wherein the filter signal is sent by the vibrational filter system to the authentication device after transmission of the filter signal to the body.

11. A computer-readable storage medium having instructions stored thereon that, when executed by a processor of an authentication device, cause the processor to perform operations comprising:
receiving a convolved authentication signal comprising
a first signal that has propagated through a body of a user and is indicative of a unique body signature of the body of the user, wherein the first signal comprises an authentication signal that originated from a user device and has been modified by the unique body signature by way of propagation through the body of the user, and a second signal originating from a vibrational filter system, wherein the second signal causes the first signal to be encrypted within the body of the user to form the convolved authentication signal;

receiving the second signal directly from the vibrational filter system;

preventing an adversary from using the authentication signal to spoof the user to be authenticated by the authentication device by deconvolving the convolved authentication signal to isolate the unique body signature using the second signal that is received separate from the convolved authentication signal; and authenticating the user based upon the unique body signature.

12. The computer-readable storage medium of claim 11, wherein:
the second signal comprises a filter signal; and
the filter signal encrypts the first signal by modifying a signal characteristic of the first signal.

13. The computer-readable storage medium of claim 12, wherein the filter signal is sent by the vibrational filter system to the authentication device before transmission of the filter signal to the body.

14. The computer-readable storage medium of claim 12, wherein the filter signal is sent by the vibrational filter system to the authentication device during transmission of the filter signal to the body.

15. The computer-readable storage medium of claim 12, wherein the filter signal is sent by the vibrational filter system to the authentication device after transmission of the filter signal to the body.

* * * * *